UNITED STATES PATENT OFFICE.

ROBERT LOCK, OF TARENTUM, PENNSYLVANIA.

PROCESS OF ACCELERATING THE ELIMINATION OF OCCLUDED SLAG FROM MOLTEN METAL.

1,008,420.  Specification of Letters Patent.  Patented Nov. 14, 1911.

No Drawing.  Application filed March 1, 1911.  Serial No. 611,670.

*To all whom it may concern:*

Be it known that I, ROBERT LOCK, a citizen of the United States, residing at Tarentum, in the county of Allegheny and State of Pennsylvania, have invented new and useful Improvements in Processes for Accelerating the Elimination of Occluded Slag from Molten Metal, of which the following is a specification.

This invention relates to a certain new and improved process for accelerating the elimination of occluded slag from molten metal before solidification.

It is well known that molten steel or molten iron, by whatever process it may be prepared, contains suspended in it small bodies, globules or particles of slag which, unless they be released or removed prior to the solidification of the metal, become entrapped and inclosed in the metal, and are retained in the solid metal to the great detriment of the quality of the latter.

The object of the present invention is to accelerate the elimination of such slaggy bodies or particles from the molten metal before solidification, so that the ultimate solid metal product is relatively free therefrom.

In carrying out my process the metal is melted down in the usual way in conjunction with any or all of the fluxes and reagents commonly employed. I then tap the fluid metal from the furnace or converter into a ladle in the usual way, the supernatant slag being allowed to remain on top of the metal in the ladle, or flowed over the lip of the ladle, either with or without thickening with lime or dolomite, or treatment with any other reagent in any usual way. From the foregoing ladle the metal is transferred in a thin stream to a second ladle, preferably by bottom pouring, varying amounts of lime or other suitable reagent, preheated or not, being gradually and concurrently thrown into the second ladle. By this means the metal flows into the second ladle in a small stream and the slag globules come into intimate contact with the lime or other reagent and are thereby held and eliminated from the molten metal.

It will be readily apparent that the molten metal treated by the foregoing process will possess a high degree of purity and that by reason of the practical elimination of the impurities usually represented by slag the metal is rendered more homogenous and less susceptible to electrolytic disassociation.

I claim as my invention:—

1. The method of eliminating slag from molten metal comprising tapping the molten metal in a thin stream into a suitable receptacle and gradually and concurrently introducing a slag removing reagent.

2. The method of eliminating slag from molten metal consisting in melting down the metal and tapping it into a ladle, pouring the metal in a thin stream from said ladle into a second ladle to separate it from the slag floating thereon in the first ladle, and gradually and concurrently introducing a slag removing reagent into the second ladle.

3. The method of eliminating slag from molten metal consisting in melting down the metal and tapping it into a ladle, pouring the metal in a thin stream from said ladle into a second ladle to separate it from the slag floating thereon in the first ladle, and gradually introducing a preheated slag removing reagent into the second ladle.

In testimony whereof I have hereunto set my hand in presence of two subscribing witnesses.

ROBERT LOCK.

Witnesses:
ARTHUR P. SCOTT,
ARNOLD C. TUCKER.